(12) United States Patent
Misaki (10) Patent No.: US 11,912,350 B2
(45) Date of Patent: Feb. 27, 2024

(54) WORK VEHICLE

(71) Applicant: KUBOTA CORPORATION, Osaka (JP)

(72) Inventor: Shinji Misaki, Sakai (JP)

(73) Assignee: KUBOTA CORPORATION, Osaka (JP)

(*) Notice: Subject to any disclaimer, the term of this patent is extended or adjusted under 35 U.S.C. 154(b) by 360 days.

(21) Appl. No.: 17/051,816

(22) PCT Filed: Dec. 17, 2019

(86) PCT No.: PCT/JP2019/049388
§ 371 (c)(1),
(2) Date: Oct. 30, 2020

(87) PCT Pub. No.: WO2020/129974
PCT Pub. Date: Jun. 25, 2020

(65) Prior Publication Data
US 2021/0300460 A1  Sep. 30, 2021

(30) Foreign Application Priority Data

Dec. 20, 2018  (JP) .................................. 2018-238885
Dec. 20, 2018  (JP) .................................. 2018-238886

(51) Int. Cl.
 *B62D 5/04*  (2006.01)
 *B62D 1/187*  (2006.01)
 *B62D 6/00*  (2006.01)

(52) U.S. Cl.
 CPC ........... *B62D 5/0412* (2013.01); *B62D 1/187* (2013.01); *B62D 6/00* (2013.01)

(58) Field of Classification Search
 CPC ........ B62D 5/0412; B62D 1/187; B62D 6/00; B62D 1/00; B62D 49/06; B62D 5/04;
 (Continued)

(56) References Cited

U.S. PATENT DOCUMENTS

2005/0275205 A1* 12/2005 Ahnafield ............. B62D 1/043
280/771
2014/0025260 A1  1/2014 McClure
(Continued)

FOREIGN PATENT DOCUMENTS

CN  108313116 A  7/2018
JP  2008-106828 A  5/2008
(Continued)

OTHER PUBLICATIONS

Official Communication issued in International Patent Application No. PCT/JP2019/049388, dated Mar. 10, 2020.
(Continued)

*Primary Examiner* — Kevin Hurley
*Assistant Examiner* — Marlon A Arce
(74) *Attorney, Agent, or Firm* — Keating & Bennett, LLP (57) ABSTRACT

A work vehicle includes an automatic steering mechanism to automatically steer a vehicle body so that the vehicle body travels on a target travel path. The automatic steering mechanism includes a motor to drive a steering shaft to rotate, and is in a steering tower. The motor is under a steering wheel and laterally adjacent to the steering shaft.

11 Claims, 7 Drawing Sheets

(58) Field of Classification Search
CPC ........ B62D 1/18; B62D 49/00; A01B 69/008; B60Y 2200/221
See application file for complete search history.

(56) References Cited

U.S. PATENT DOCUMENTS

2018/0229601 A1* 8/2018 Komatsu ................ B60K 35/00
2021/0360843 A1* 11/2021 Misaki ................ G05D 1/0061

FOREIGN PATENT DOCUMENTS

| JP | 2016-023973 A | 2/2016 |
| JP | 2017-087953 A | 5/2017 |
| WO | 2018/221507 A1 | 12/2018 |

OTHER PUBLICATIONS

Official Communication issued in corresponding European Patent Application No. 19898551.7, dated Aug. 17, 2022.

* cited by examiner

Fig.7

WORK VEHICLE

BACKGROUND OF THE INVENTION

1. Field of the Invention

The present invention relates to a work vehicle capable of automatically steering a vehicle body so that the vehicle body travels on a target travel path.

2. Description of the Related Art

A known example of work vehicles is the work vehicle disclosed in Japanese Unexamined Patent Application Publication, Tokukai, No. 2016-23973. The work vehicle disclosed in Japanese Unexamined Patent Application Publication, Tokukai, No. 2016-23973 is capable of automatically steering the travel vehicle body so that the travel vehicle body travels on a target travel path. The work vehicle disclosed in Japanese Unexamined Patent Application Publication, Tokukai, No. 2016-23973 includes a motor configured to drive a steering shaft to rotate (namely, the "steering motor (52)" in the document). The work vehicle disclosed in Japanese Unexamined Patent Application Publication, Tokukai, No. 2016-23973 is arranged such that the motor is provided at a base portion of a steering wheel (namely, the "steering wheel (20)" in the document).

SUMMARY OF THE INVENTION

The work vehicle disclosed in Japanese Unexamined Patent Application Publication, Tokukai, No. 2016-23973 has a limited space around the base portion of the steering wheel. It is not easy to place a motor in the space.

The above circumstances have led to a demand for a work vehicle having a space that easily accommodates a motor for automatic steering.

The work vehicle disclosed in Japanese Unexamined Patent Application Publication, Tokukai, No. 2016-23973 has a limited space around the base portion of the steering wheel. If the driving force of the motor is to be transmitted to the steering shaft with use of a gear mechanism contained in a gear case, it is not easy to place such a gear case in the space.

The above circumstances have led to a demand for a work vehicle having a space that easily accommodates a gear case for automatic steering.

A preferred embodiment of the present invention provides a work vehicle including a steering wheel to steer a vehicle body of the work vehicle, a steering shaft connected with the steering wheel, extending downward from the steering wheel, and rotatable with use of the steering wheel, a steering tower for which the steering wheel and the steering shaft are provided, and an automatic steering mechanism to automatically steer the vehicle body so that the vehicle body travels on a target travel path, wherein the automatic steering mechanism includes a motor to drive the steering shaft to rotate, the automatic steering mechanism is in the steering tower, and the motor is under the steering wheel and laterally adjacent to the steering shaft.

The above structural arrangement keeps a relatively large open space under the steering wheel and laterally adjacent to the steering shaft. The above structural arrangement allows the motor to be placed in a space under the steering wheel and laterally adjacent to the steering shaft. This makes it easy to find a space for the motor.

If the motor is placed under the steering wheel and in front or back of the steering shaft, the steering tower will be larger in the front-back direction and may disturb the driver. With the above structural arrangement, however, the motor is under the steering wheel and laterally adjacent to the steering shaft. The steering tower is thus not larger in the front-back direction and does not disturb the driver.

A preferred embodiment of the present invention may preferably be structured such that the automatic steering mechanism further includes (i) a gear mechanism to transmit a driving force of the motor to the steering shaft, and (ii) a gear case containing the gear mechanism, and the motor and the gear case are arranged vertically.

The above structural arrangement causes the motor and the gear case to be located close to each other in the up-down direction. This allows the motor and the gear case to be provided in a compact manner.

A preferred embodiment of the present invention may preferably be structured such that the motor is supported by the gear case.

The above structural arrangement allows the gear case to be used to support the motor. This eliminates the need to include a dedicated member for supporting the motor.

A preferred embodiment of the present invention may preferably be structured such that the steering tower is swingable about a swing axis extending in a left-right direction of the vehicle body, and the work vehicle further includes a tilt mechanism to adjust a position of the steering tower about the swing axis.

The above structural arrangement allows the position of the steering wheel to be adjusted in accordance with the build of the driver. The above structural arrangement also allows a work vehicle to be produced that includes both an automatic steering mechanism and a tilt mechanism and that is thus highly convenient.

A preferred embodiment of the present invention provides a work vehicle including a steering wheel to steer a vehicle body of the work vehicle, a steering shaft connected with the steering wheel, extending downward from the steering wheel, and rotatable with use of the steering wheel, a steering tower for which the steering wheel and the steering shaft are provided, and an automatic steering mechanism to automatically steer the vehicle body so that the vehicle body travels on a target travel path, wherein the automatic steering mechanism includes (i) a motor to drive the steering shaft to rotate, (ii) a gear mechanism to transmit a driving force of the motor to the steering shaft, and (iii) a gear case containing the gear mechanism, the automatic steering mechanism is in the steering tower, and the gear case is under the steering wheel and shifted to a first side in a left-right direction of the vehicle body with respect to a rotation axis of the steering wheel.

The above structural arrangement keeps a relatively large open space under the steering wheel and next to the steering shaft. The above structural arrangement allows the gear case to be located in a space under the steering wheel and on one side of the steering shaft in the left-right direction of the vehicle body. This makes it easy to find a space for the gear case. The above structural arrangement also allows a member other than the gear case to be located under the steering wheel and on the other side of the steering shaft in the left-right direction of the vehicle body. This makes it possible to effectively utilize a space next to the steering shaft.

If the gear case is located under the steering wheel and shifted to the front or back side of the rotation axis of the steering wheel, the steering tower will be larger in the front-back direction and may disturb the driver. With the above structural arrangement, however, the gear case is under the steering wheel and shifted to one side of the rotation axis of the steering wheel in the left-right direction of the vehicle body. The steering tower is thus not larger in the front-back direction and does not disturb the driver.

A preferred embodiment of the present invention may preferably be structured such that the motor and the gear case are arranged vertically.

The above structural arrangement causes the motor and the gear case to be located close to each other in the up-down direction. This allows the motor and the gear case to be provided in a compact manner.

A preferred embodiment of the present invention may preferably be structured such that the gear case has a thickness in an up-down direction which thickness is equal to or substantially equal to a thickness of the motor in the up-down direction.

A gear case tends to have a thickness in the up-down direction that is larger than the thickness of a motor in the up-down direction. With the above structural arrangement, however, the gear case is thinner. This saves space for the gear case.

A preferred embodiment of the present invention may preferably be structured such that the motor is supported by a portion of the gear case which portion is present on the first side of the rotation axis.

The above structural arrangement allows the gear case to support the motor. This eliminates the need to include a dedicated member for supporting the motor. The above structural arrangement allows a large portion of the gear case to be located on one side of the rotation axis of the gear case in the left-right direction of the vehicle body to support the motor.

A preferred embodiment of the present invention may preferably further include a forward-reverse switching lever to switch a travel direction of the vehicle body between a forward travel and a reverse travel, wherein the forward-reverse switching lever extends upward from a height below the gear case to a height between an upper end and a lower end of the steering wheel.

The above structural arrangement positions an upper portion (that is, the grip portion) of the forward-reverse switching lever closely to the steering wheel. This allows the driver to, for operation of the forward-reverse switching lever, move a hand only over a short distance from the steering wheel to the forward-reverse switching lever. This improves the operability of the forward-reverse switching lever.

A preferred embodiment of the present invention may preferably further include a forward-reverse switch to switch the travel direction of the vehicle body between the forward travel and the reverse travel in accordance with an operation position of the forward-reverse switching lever, wherein the forward-reverse switch is under a portion of the gear case which portion is on the first side of the rotation axis.

As described above, the gear case is shifted to one side of the rotation axis of the steering wheel in the left-right direction of the vehicle body. This allows for a large space under the gear case and on that side of the rotation axis in the left-right direction of the vehicle body as compared to the other side of the rotation axis in the left-right direction of the vehicle body. The above structural arrangement positions the forward-reverse switch in a large space under a portion of the gear case on one side of the rotation axis in the left-right direction of the vehicle body. This makes it easy to find a space for the forward-reverse switch.

A preferred embodiment of the present invention may preferably be structured such that the steering tower is swingable about a swing axis extending in a left-right direction of the vehicle body, and the work vehicle further includes a tilt mechanism to adjust a position of the steering tower about the swing axis.

The above structural arrangement allows the position of the steering wheel to be adjusted in accordance with the build of the driver. The above structural arrangement also allows a work vehicle to be produced that includes both an automatic steering mechanism and a tilt mechanism and that is thus highly convenient.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The description below describes preferred embodiments of the present invention with reference to drawings.

Figure 1:
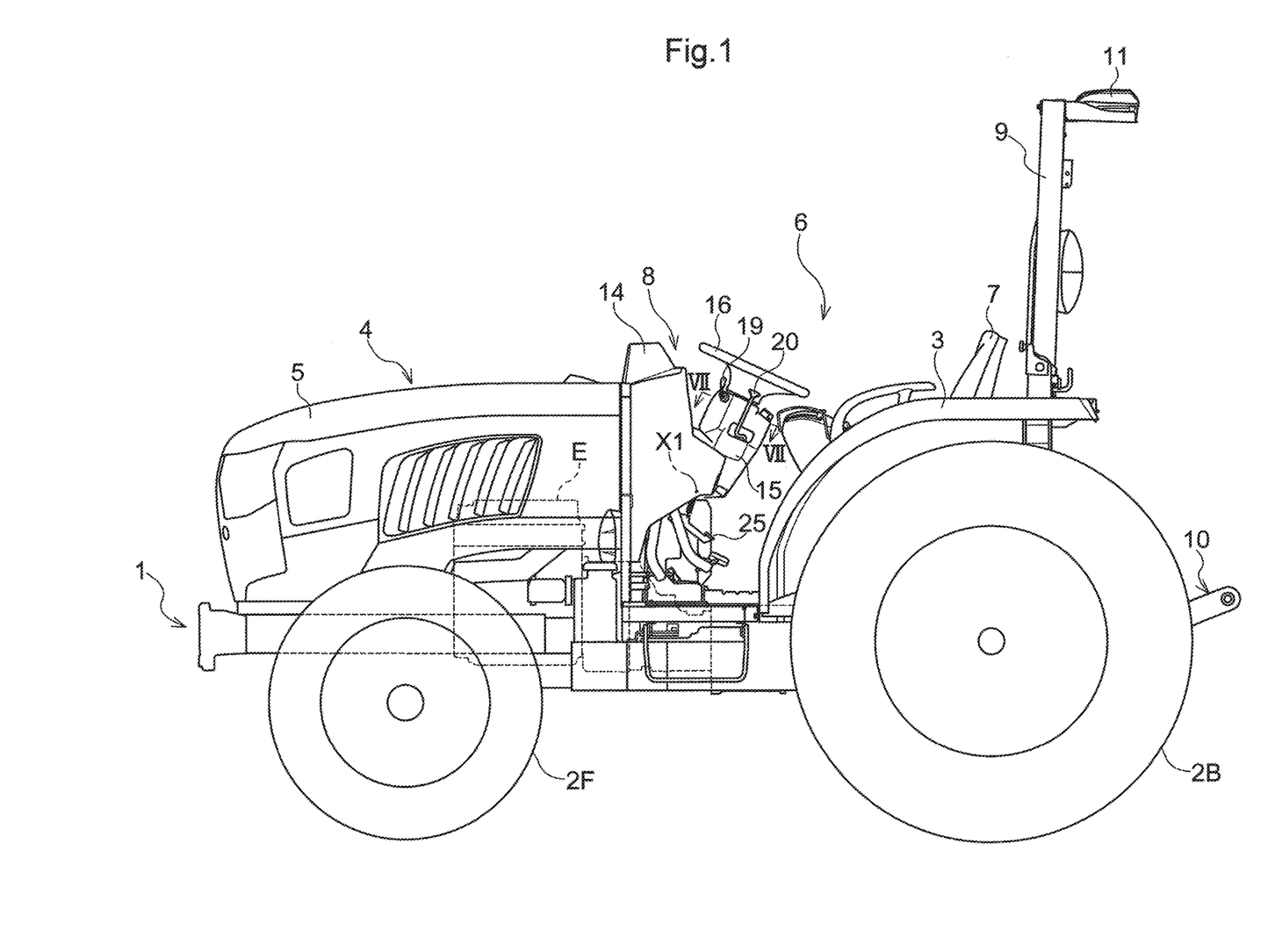
FIG. 1 is a left side view of a tractor.
Figure 2:
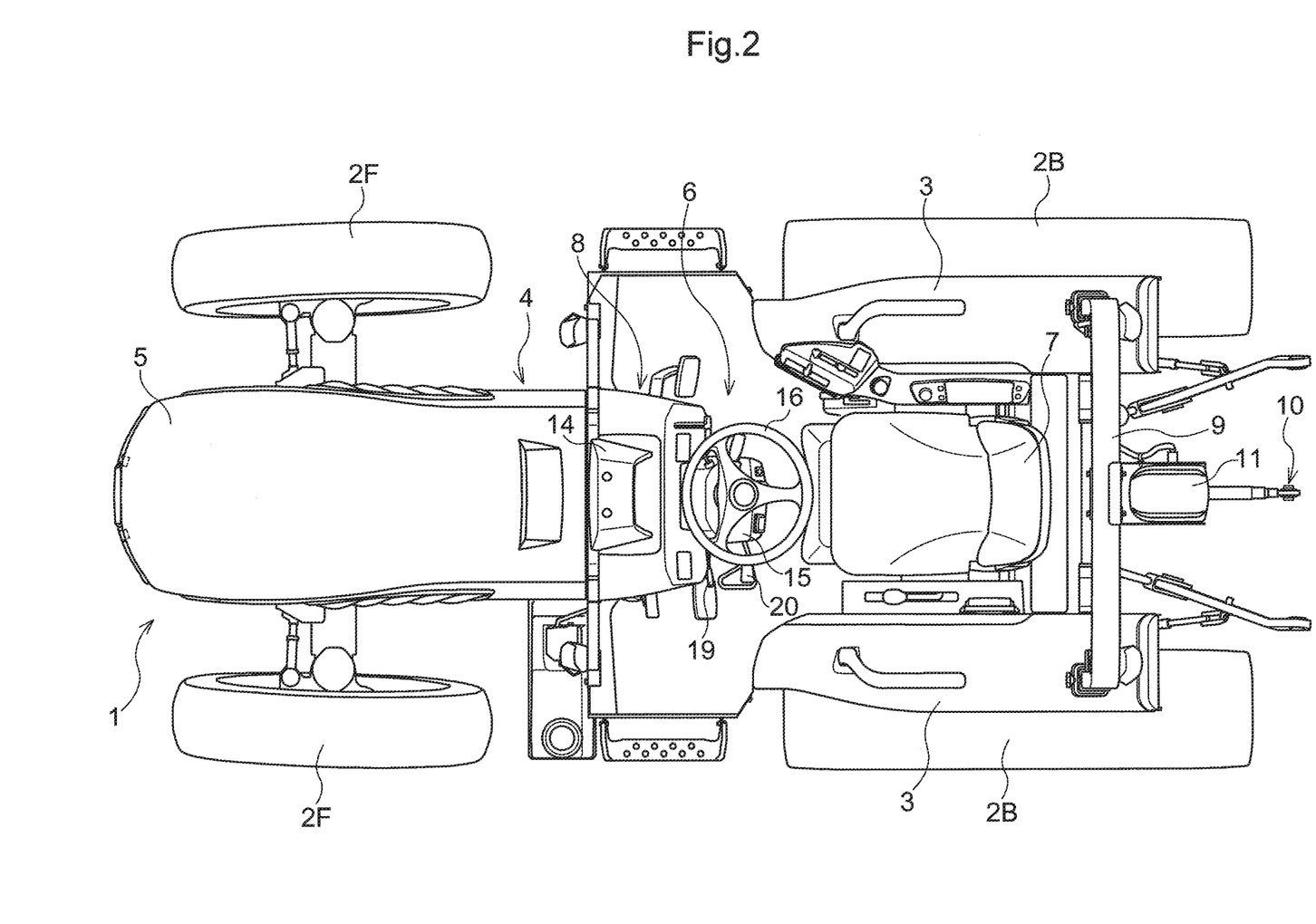
FIG. 2 is a plan view of a tractor.

FIGS. 1 and 2 each illustrate a tractor (work vehicle). The tractor includes a travel vehicle body 1. The travel vehicle body 1 is, for example, of a four-wheel drive type. The travel vehicle body 1 is provided with a pair of left and right drivable and steerable front wheels 2F and a pair of left and right drivable rear wheels 2B. The travel vehicle body 1 is also provided with a pair of left and right fenders 3 that cover the pair of left and right rear wheels 2B, respectively.

The travel vehicle body 1 has a front half provided with a motor section 4. The motor section 4 includes an engine E and a hood 5 that covers the engine E. The travel vehicle body 1 has a rear half provided with a driver section 6 for a driver to get in. The driver section 6 includes a driver's seat 7 for a driver to sit on and a front panel 8 in front of the driver's seat 7. The travel vehicle body 1 is provided with a ROPS 9 near the driver's seat 7. The travel vehicle body 1 has a rear end provided with a link mechanism 10 to which a work device (not shown in the drawings) such as a rotary tiller device, is attachable.

The tractor is provided with a GPS antenna unit 11 and an inertia measuring device (not shown in the drawings). The GPS antenna unit 11 is configured to receive positional information from GPS (global positioning system) satellites and determine the position of the travel vehicle body 1 on the basis of the positional information received. The GPS antenna unit 11 is supported by an upper portion of the ROPS 9 at such a position as to have a left-right center that coincides with the left-right center of the vehicle body. The inertia measuring device is configured to measure inertia information (such as information on a yaw angle, a pitch angle, and a roll angle) of the travel vehicle body 1. The tractor includes an automatic steering mechanism 12 (see FIGS. 5 to 7) configured to, on the basis of (i) the position of the travel vehicle body 1 as determined by the GPS antenna unit 11 and (ii) the inertia information of the travel vehicle body 1 as measured by the inertia measuring device, automatically steer the travel vehicle body 1 so that the travel vehicle body 1 travels on a target travel path.

As illustrated in FIGS. 3 to 6, the front panel 8 includes a meter panel 13, a monitor 14 (display device), and a steering tower 15. The steering tower 15 is provided with, for example, a steering wheel 16. The meter panel 13 is positioned under a front portion of the steering wheel 16. The meter panel 13 is provided with, for example, a fuel meter, an engine tachometer, a water temperature meter, a liquid crystal display, and various lamps. The monitor 14 is positioned above the meter panel 13 and in front of the steering wheel 16. The monitor 14 is configured to display information on automatic steering of the travel vehicle body 1. The monitor 14 functions as a guidance monitor for automatic steering of the travel vehicle body 1.

The steering tower 15 is positioned in front of the driver's seat 7. The steering tower 15 is provided with a steering wheel 16, a steering shaft 17, a steering post 18, an automatic steering switching lever 19, a forward-reverse switching lever 20, setting switches 21, a switch 22, and an automatic steering mechanism 12. Members such as the steering post 18 and the automatic steering mechanism 12 are covered by a steering cover 23.

The steering tower 15 is supported by a support frame 29 via the steering post 18 so as to be swingable about a swing axis X1 extending in the left-right direction of the vehicle body. The tractor is provided with a tilt mechanism 24 configured to adjust the position of the steering tower 15 about the swing axis X1. The front panel 8 has a lower portion provided with a tilt pedal 25 with which to operate the tilt mechanism 24. Pressing the tilt pedal 25 with a foot allows the position of the steering tower 15 to be adjusted with use of the tilt mechanism 24. Releasing the pressed tilt pedal 25 causes the position of the steering tower 15 to be fixed.

Figure 5:
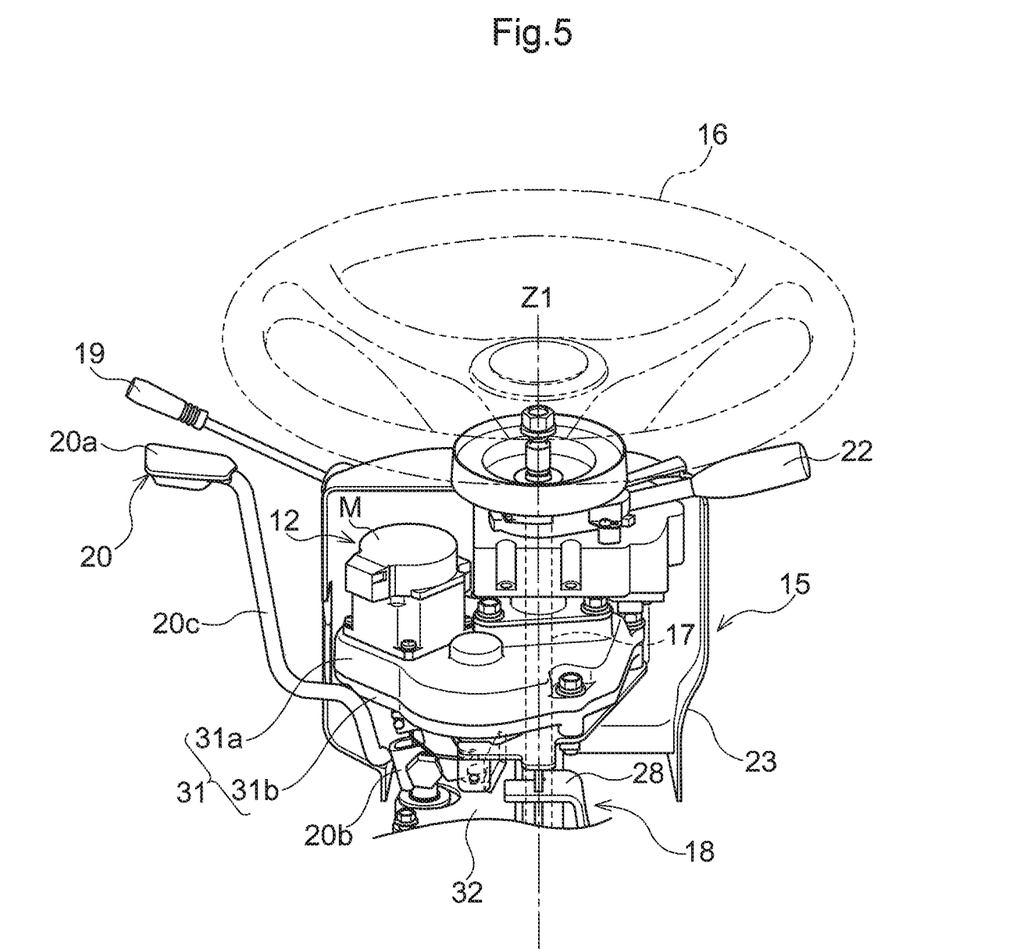
FIG. 5 is a rear view of the internal structure of a steering tower.
Figure 6:
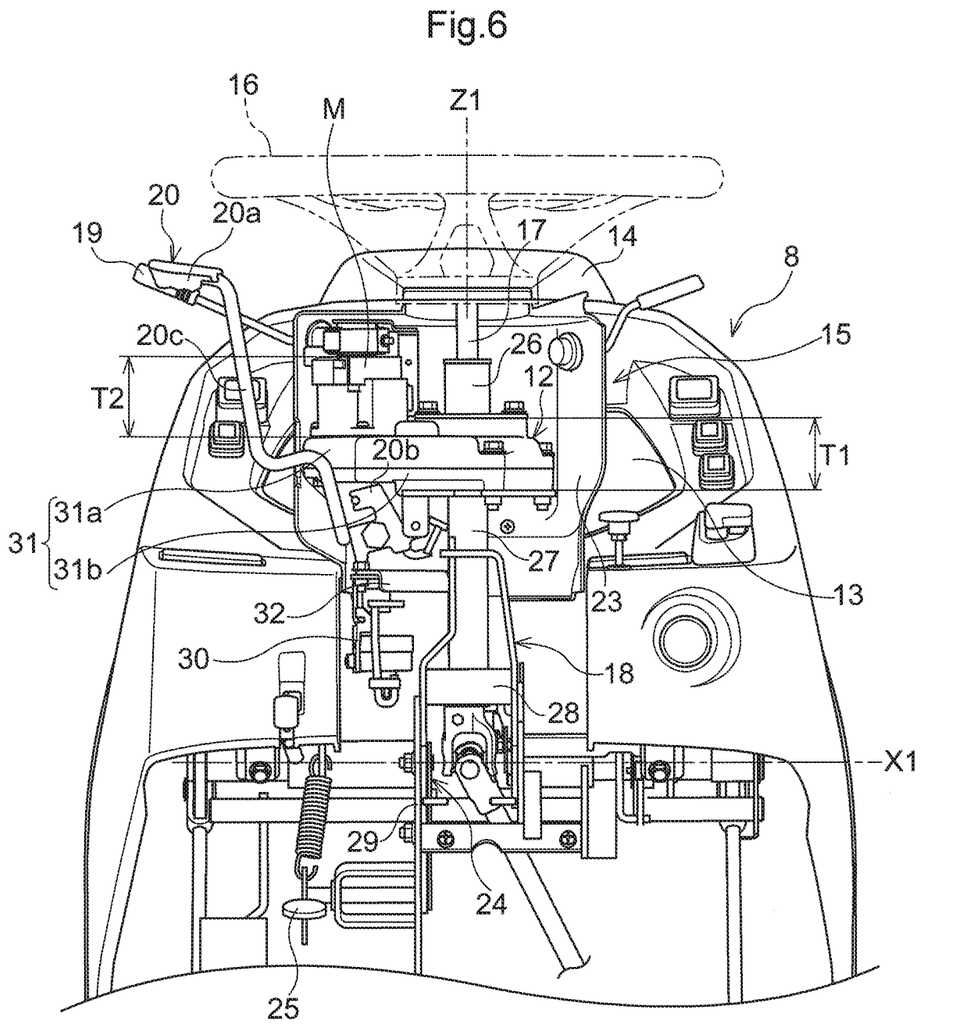
FIG. 6 is a rear view of the internal structure of a front panel.

The steering wheel 16 is for use to steer the travel vehicle body 1. The steering shaft 17 is connected with the steering wheel 16 and extends downward from the steering wheel 16. The steering shaft 17 is supported by the steering post 18 so as to be rotatable about the axis of the steering shaft 17 (that is, the rotation axis of the steering wheel 16) Z1 with use of the steering wheel 16. The steering post 18 includes (i) an upper insertion portion 26 through which an upper portion of the steering shaft 17 extends and by which the upper portion is supported, (ii) a lower insertion portion 27 through which a lower portion of the steering shaft 17 extends and by which the lower portion is supported, and (iii) a base portion 28 supporting the lower insertion portion 27. The base portion 28 is supported by the support frame 29 so as to be swingable about the swing axis X1.

The automatic steering switching lever 19 is for use to start or end automatic steering of the travel vehicle body 1 and otherwise. The forward-reverse switching lever 20 is for use to switch the travel direction of the travel vehicle body 1 between a forward travel and a reverse travel. The automatic steering switching lever 19 and the forward-reverse switching lever 20 are positioned at an upper portion of the steering tower 15 and below the steering wheel 16. The automatic steering switching lever 19 and the forward-reverse switching lever 20 are both positioned on one side of the rotation axis Z1 of the steering wheel 16 in the left-right direction of the vehicle body (for the present preferred embodiment, on the left side). The automatic steering switching lever 19 and the forward-reverse switching lever 20 are located at respective positions different from each other in the front-back direction of the vehicle body. For the present preferred embodiment, the automatic steering switching lever 19 is positioned forward of the forward-reverse switching lever 20.

The steering tower 15 is provided with a forward-reverse switch 30 configured to switch the travel direction of the travel vehicle body 1 between a forward travel and a reverse travel in accordance with the operation position of the forward-reverse switching lever 20. The forward-reverse switch 30 is capable of detecting the operation position of the forward-reverse switching lever 20. The forward-reverse switch 30 is positioned under that portion of a gear case 31 on the left side from the rotation axis Z1 of the steering wheel 16. The forward-reverse switch 30 is supported by the steering post 18 via a stay 32.

The forward-reverse switching lever 20 is switchable to any of (i) a forward-travel position for the travel vehicle body 1 to travel forward, (ii) a reverse-travel position for the travel vehicle body 1 to travel backward, and (iii) a neutral position for the travel vehicle body 1 to stop. The forward-reverse switching lever 20 extends upward from a height below the gear case 31 to a height between the upper end and the lower end of the steering wheel 16. The forward-reverse switching lever 20 includes (i) a grip portion 20a for the driver to hold, (ii) a connection portion 20b connected with the forward-reverse switch 30, and (iii) a rod portion 20c extending between the grip portion 20a and the connection portion 20b. The grip portion 20a is positioned at a height between the upper end and the lower end of the steering wheel 16. The rod portion 20c extends upward from the connection portion 20b in such a pattern as to be spaced apart from the gear case 31.

Figure 3:
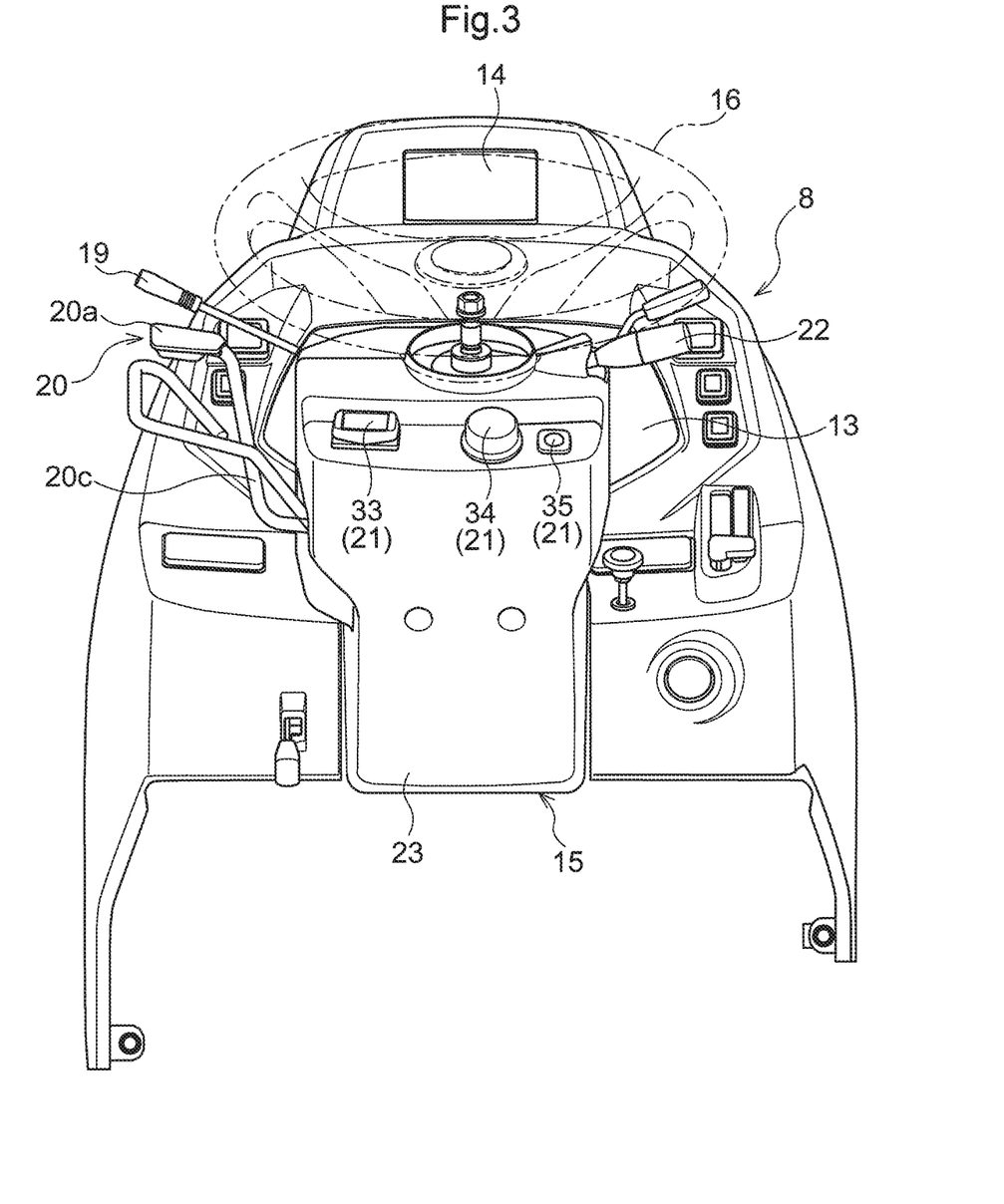
FIG. 3 is a rear view of a front panel.
Figure 4:
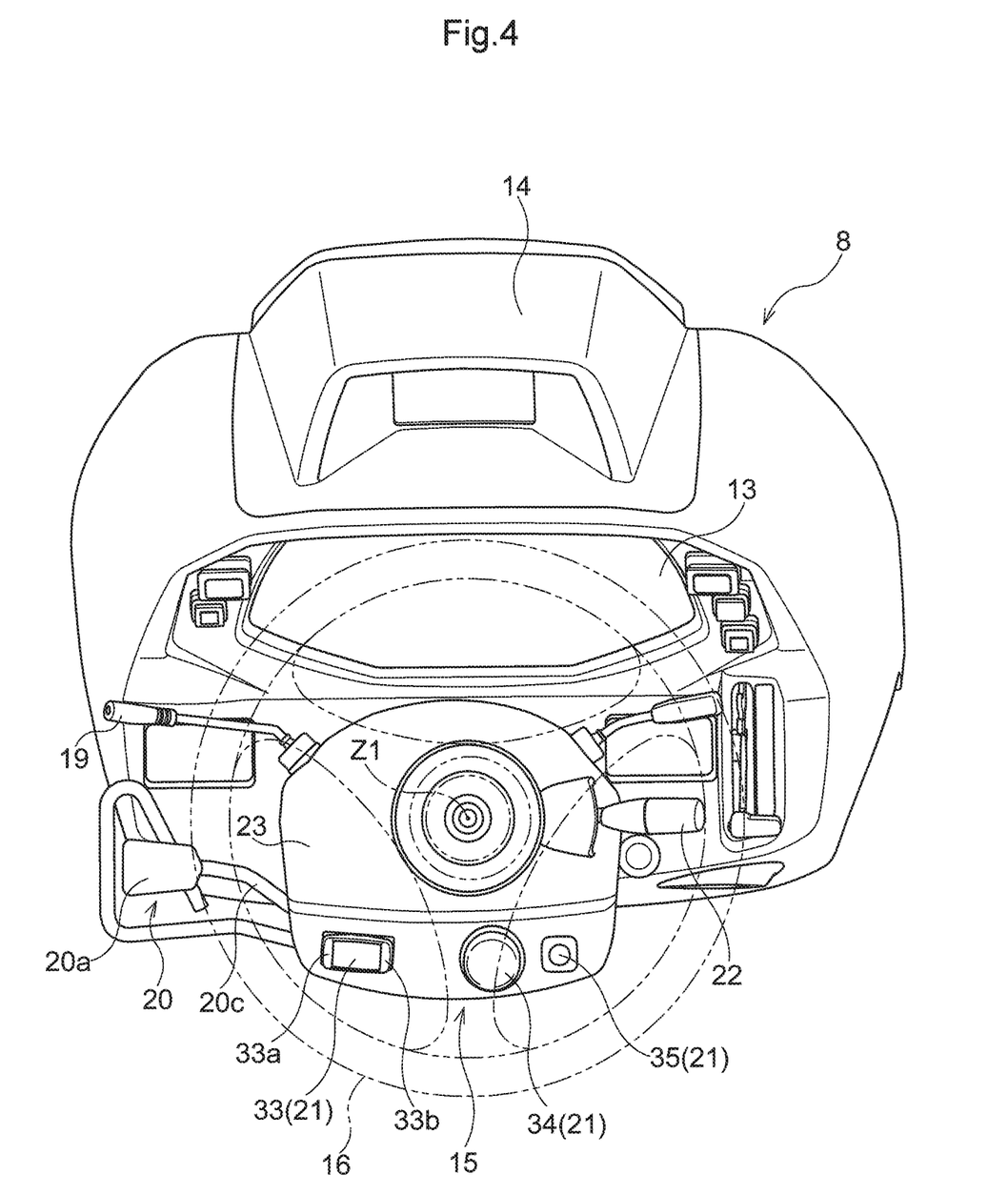
FIG. 4 is a plan view of a front panel.

The setting switches 21 are each for use to select a setting for automatic steering of the travel vehicle body 1. The setting switches 21 include a correction switch 33, a dial switch 34, and a switch 35. The correction switch 33, the dial switch 34, and the switch 35 are positioned at an upper portion of the steering tower 15 and below the steering wheel 16. The correction switch 33, the dial switch 34, and the switch 35 are positioned on a side of the rotation axis Z1 of the steering wheel 16 on which the driver's seat 7 is located (that is, on the back side). The correction switch 33, the dial switch 34, and the switch 35 are arranged laterally in this order from the left side.

The tractor is configured to determine the position of the travel vehicle body 1 on the basis of (i) the position of the travel vehicle body 1 as determined by the GPS antenna unit 11 and (ii) the inertia information of the travel vehicle body 1 as measured by the inertia measuring device. The correction switch 33 is for use to correct the determined position of the travel vehicle body 1. The correction switch 33 includes (i) a left correction switch portion 33a to correct the determined position of the travel vehicle body 1 to the left side and (ii) a right correction switch portion 33b to correct the determined position of the travel vehicle body 1 to the right side.

The dial switch 34 is capable of being pressed and rotated. Pressing the dial switch 34 causes, for example, any of various instructions to be entered. Long-pressing the dial switch 34 causes, for example, any of various menus to be invoked. Rotating the dial switch 34 clockwise or counter-clockwise causes, for example, any of various items to be selected. The functions corresponding to the different operations of the dial switch 34 are, however, not limited to the above (that is, the entry, menu invocation, and selection).

The switch 35 is capable of being pressed. Pressing the switch 35 causes, for example, the previous screen to be displayed. Long-pressing the switch 35 causes, for example, the home screen to be displayed. The functions corresponding to the different operations of the switch 35 are, however, not limited to the above (that is, displaying the previous screen or home screen).

The switch 22 is for use to operate the headlights and turn signals. The switch 22 is positioned to the right side of the rotation axis Z1 of the steering wheel 16.

Figure 7:
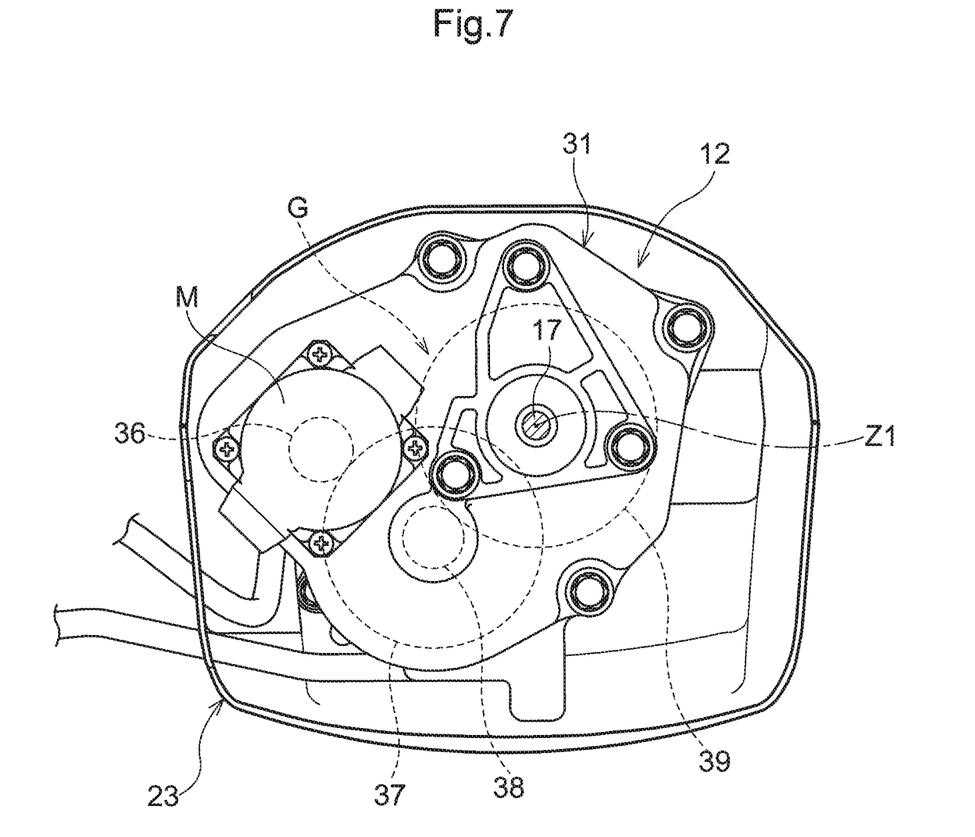
FIG. 7 is a cross-sectional view taken along line VII-VII in FIG. 1.

As illustrated in FIGS. 5 to 7, the automatic steering mechanism 12 includes (i) a motor M configured to drive the steering shaft 17 to rotate, (ii) a gear mechanism G configured to transmit the driving force of the motor M to the steering shaft 17, and (iii) a gear case 31 containing the gear mechanism G. The motor M and the gear case 31 are arranged vertically. Specifically, the motor M is positioned above the gear case 31.

The gear mechanism G includes (i) an output gear 36 provided for the output shaft of the motor M, (ii) a first relay gear 37 meshing with the output gear 36, (iii) a second relay gear 38 coaxial with the first relay gear 37 and configured to rotate together with the first relay gear 37, and (iv) an input gear 39 provided on the steering shaft 17 and meshing with the second relay gear 38. The gear case 31 is positioned under the steering wheel 16 and shifted to the left side with respect to the rotation axis Z1 of the steering wheel 16. The gear case 31 has a thickness T1 in the up-down direction which thickness T1 is equal to or substantially equal to the thickness T2 of the motor M in the up-down direction. The gear case 31 is structured to be divided into two vertically arranged halves, namely an upper case portion 31a and a lower case portion 31b. The gear case 31 is supported by the steering post 18 with the steering shaft 17 extending through the gear case 31 in the up-down direction. The upper case portion 31a has an upper surface portion to which a lower end portion of the upper insertion portion 26 is fixed (bolted). The lower case portion 31b has a lower surface portion to which an upper end portion of the lower insertion portion 27 is fixed (bolted).

The motor M is positioned under the steering wheel 16 and to the left of the steering shaft 17. The motor M is supported by the gear case 31. Specifically, the motor M is supported by (that is, placed on and supported by) a portion of the gear case 31 which portion is positioned to the left side of the rotation axis Z1 of the steering wheel 16. The motor M is fixed (screwed) to the upper surface portion of the upper case portion 31a.

In the preferred embodiments described above, the motor M is positioned under the steering wheel 16 and to the left of the steering shaft 17. The motor M may alternatively be positioned under the steering wheel 16 and to the right of the steering shaft 17.

In the preferred embodiments described above, the motor M is positioned above the gear case 31. The gear case 31 may alternatively be positioned above the motor M. The motor M and the gear case 31 may alternatively be arranged in the left-right direction. The motor M and the gear case 31 may alternatively be arranged in the front-back direction.

In the preferred embodiments described above, the motor M is supported by a portion of the gear case 31 which portion is positioned to the left side of the rotation axis Z1 of the steering wheel 16. The motor M may alternatively be supported by a portion of the gear case 31 which portion is positioned to the right side of the rotation axis Z1 of the steering wheel 16. The motor M may alternatively be supported by a member other than the gear case 31.

In the preferred embodiments described above, the gear case 31 is positioned under the steering wheel 16 and shifted to the left side with respect to the rotation axis Z1 of the steering wheel 16. The gear case 31 may alternatively be positioned under the steering wheel 16 and shifted to the right side with respect to the rotation axis Z1 of the steering wheel 16.

In the preferred embodiments described above, the gear case 31 has a thickness T1 in the up-down direction which thickness T1 is equal to or substantially equal to the thickness T2 of the motor M in the up-down direction. The gear case 31, however, does not necessarily have a thickness T1 in the up-down direction which thickness T1 is equal to or substantially equal to the thickness T2 of the motor M in the up-down direction. The gear case 31 may alternatively have a thickness T1 in the up-down direction which thickness T1 is, for example, larger than the thickness T2 of the motor M in the up-down direction.

In the preferred embodiments described above, the forward-reverse switching lever 20 extends upward from a height below the gear case 31 to a height between the upper end and the lower end of the steering wheel 16. The arrangement of the forward-reverse switching lever 20 is, however, not limited to that described for the preferred embodiments described above. The forward-reverse switching lever 20 may, for instance, have an upper end portion (that is, the grip portion 20a) positioned below the lower end of the steering wheel 16.

In the preferred embodiments described above, the setting switches 21 include a correction switch 33, a dial switch 34, and a switch 35. The arrangement of the setting switches 21 is, however, not limited to that described for the preferred embodiments described above. The setting switches 21 may, for instance, alternatively include not only the correction switch 33, the dial switch 34, and the switch 35, but also a switch(es) other than the correction switch 33, the dial switch 34, and the switch 35. The setting switches 21 may alternatively include a switch(es) other than the correction switch 33, the dial switch 34, and the switch 35 in place of at least one of the correction switch 33, the dial switch 34, and the switch 35. Further alternatively, the steering tower 15 may include only one operation switch as a setting switch 21.

In the preferred embodiments described above, the setting switches 21 are positioned on a side of the rotation axis Z1 of the steering wheel 16 on which the driver's seat 7 is located (that is, on the back side). The setting switches 21 may alternatively be positioned on one side of the rotation axis Z1 of the steering wheel 16 in the left-right direction of the vehicle body.

In the preferred embodiments described above, the correction switch 33, the dial switch 34, and the switch 35 are arranged laterally. The correction switch 33, the dial switch 34, and the switch 35 may alternatively be arranged in the front-back direction.

In the preferred embodiments described above, the automatic steering switching lever 19 and the forward-reverse switching lever 20 are both positioned on the left side of the rotation axis Z1 of the steering wheel 16. The automatic steering switching lever 19 and the forward-reverse switching lever 20 may alternatively be both positioned on the right side of the rotation axis Z1 of the steering wheel 16. The automatic steering switching lever 19 and the forward-reverse switching lever 20 may alternatively be positioned such that one of the two levers is on one side of the rotation axis Z1 of the steering wheel 16 in the left-right direction of the vehicle body and that the other of the two levers is on the other side of the rotation axis Z1 of the steering wheel 16 (separate positioning).

In the preferred embodiments described above, the automatic steering switching lever 19 is positioned forward of the forward-reverse switching lever 20. The forward-reverse switching lever 20 may alternatively be positioned forward of the automatic steering switching lever 19. The automatic steering switching lever 19 and the forward-reverse switching lever 20 may alternatively be at the same position in the front-back direction of the vehicle body.

In the preferred embodiments described above, the forward-reverse switch 30 is positioned under a portion of the gear case 31 that is located on the left side from the rotation axis Z1 of the steering wheel 16. The position of the forward-reverse switch 30 is, however, not limited to the above position for the preferred embodiments described above. The forward-reverse switch 30 may be positioned, for example, under a portion of the gear case 31 that is located on the right side from the rotation axis Z1 of the steering wheel 16. The forward-reverse switch 30 may alternatively be located at a position that is not under the gear case 31.

In the preferred embodiments described above, the automatic steering switching tool includes an automatic steering switching lever 19. The automatic steering switching tool may alternatively include a switch.

In the preferred embodiments described above, the forward-reverse switching tool includes a forward-reverse switching lever 20. The forward-reverse switching tool may alternatively include a switch.

In the preferred embodiments described above, the setting operation tool includes setting switches 21. The setting operation tool may alternatively include a lever.

In the preferred embodiments described above, the tractor is provided with a tilt mechanism 24. The tractor is, however, not necessarily provided with a tilt mechanism 24.

In the preferred embodiments described above, the tractor is not provided with a cabin covering the driver section 6. The tractor may, however, be provided with such a cabin in place of the ROPS 9.

Preferred embodiments of the present invention are applicable to work vehicles (for example, tractors) each capable of automatically steering a vehicle body so that the vehicle body travels on a target travel path.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A work vehicle, comprising:
a steering wheel to steer a vehicle body of the work vehicle;
a steering shaft connected with the steering wheel, extending downward from the steering wheel, and rotatable in response to turning of the steering wheel;
a steering tower for which the steering wheel and the steering shaft are provided;
an automatic steering mechanism to automatically steer the vehicle body so that the vehicle body travels on a target travel path;
an automatic steering switching lever to start or end automatic steering of the vehicle body; and
a forward-reverse switching lever to switch a travel direction of the vehicle body between a forward travel and a reverse travel; wherein
the automatic steering mechanism includes a motor to drive the steering shaft to rotate;
the automatic steering mechanism is in the steering tower;
the motor is under the steering wheel and laterally adjacent to the steering shaft; and
the automatic steering switching lever and the forward-reverse switching lever are both positioned (i) at an upper portion of the steering tower, and (ii) on one side of a rotation axis of the steering wheel in a left-right direction of the vehicle body, and are located at respective positions different from each other in a front-back direction of the vehicle body.

2. The work vehicle according to claim 1, wherein
the automatic steering mechanism further includes (i) a gear mechanism to transmit a driving force of the motor to the steering shaft and (ii) a gear case containing the gear mechanism; and
the motor and the gear case are arranged vertically.

3. The work vehicle according to claim 2, wherein the motor is supported by the gear case.

4. The work vehicle according to claim 1, wherein
the steering tower is swingable about a swing axis extending in a left-right direction of the vehicle body; and
the work vehicle further comprises a tilt mechanism to adjust a position of the steering tower about the swing axis.

5. A work vehicle, comprising:
a steering wheel to steer a vehicle body of the work vehicle;
a steering shaft connected with the steering wheel, extending downward from the steering wheel, and rotatable in response to turning of the steering wheel;
a steering tower for which the steering wheel and the steering shaft are provided;
an automatic steering mechanism to automatically steer the vehicle body so that the vehicle body travels on a target travel path;
an automatic steering switching lever to start or end automatic steering of the vehicle body; and
a forward-reverse switching lever to switch a travel direction of the vehicle body between a forward travel and a reverse travel; wherein
the automatic steering mechanism includes (i) a motor to drive the steering shaft to rotate, (ii) a gear mechanism to transmit a driving force of the motor to the steering shaft, and (iii) a gear case containing the gear mechanism;
the automatic steering mechanism is in the steering tower;
the gear case is under the steering wheel and shifted to a first side in a left-right direction of the vehicle body with respect to a rotation axis of the steering wheel; and
the automatic steering switching lever and the forward-reverse switching lever are both positioned (i) at an upper portion of the steering tower, and (ii) on one side of the rotation axis of the steering wheel in the left-right direction of the vehicle body, and are located at respective positions different from each other in a front-back direction of the vehicle body.

6. The work vehicle according to claim 5, wherein the motor and the gear case are arranged vertically.

7. The work vehicle according to claim 6, wherein the gear case has a thickness in an up-down direction that is equal to or substantially equal to a thickness of the motor in the up-down direction.

8. The work vehicle according to claim 6, wherein the motor is supported by a portion of the gear case on the first side of the rotation axis.

9. The work vehicle according to claim 5, wherein
the forward-reverse switching lever extends upward from below the gear case to between an upper end and a lower end of the steering wheel.

10. The work vehicle according to claim 9, further comprising:
a forward-reverse switch to switch the travel direction of the vehicle body between the forward travel and the reverse travel in accordance with an operation position of the forward-reverse switching lever; wherein
the forward-reverse switch is under a portion of the gear case on the first side of the rotation axis.

11. The work vehicle according to claim 5, wherein
the steering tower is swingable about a swing axis extending in a left-right direction of the vehicle body; and
the work vehicle further comprises a tilt mechanism to adjust a position of the steering tower about the swing axis.

\* \* \* \* \*